(12) United States Patent
Schmidt

(10) Patent No.: US 9,090,382 B2
(45) Date of Patent: Jul. 28, 2015

(54) THERMOFORMED ARTICLE

(71) Applicant: Obrist Closures Switzerland GmbH, Reinach (CH)

(72) Inventor: Patrick Schmidt, Zell-Kaimt (DE)

(73) Assignee: Obrist Closures Switzerland GmbH, Reinach (DE)

(*) Notice: Subject to any disclaimer, the term of this patent is extended or adjusted under 35 U.S.C. 154(b) by 81 days.

(21) Appl. No.: 13/758,959

(22) Filed: Feb. 4, 2013

(65) Prior Publication Data

US 2013/0221015 A1 Aug. 29, 2013

Related U.S. Application Data

(63) Continuation of application No. PCT/GB2011/001174, filed on Aug. 4, 2011.

(30) Foreign Application Priority Data

Aug. 4, 2010 (GB) .................................. 1013137.3

(51) Int. Cl.
  *B65D 17/34* (2006.01)
  *B65D 39/00* (2006.01)
  *B65D 47/12* (2006.01)
  *B29C 45/16* (2006.01)
  *B29C 45/00* (2006.01)
  *B29K 9/06* (2006.01)
  *B29L 31/56* (2006.01)

(52) U.S. Cl.
  CPC ........ *B65D 39/0017* (2013.01); *B29C 45/0003* (2013.01); *B29C 45/16* (2013.01); *B65D 47/12* (2013.01); *B65D 47/121* (2013.01); *B65D 47/127* (2013.01); *B29C 2045/1601* (2013.01); *B29K 2009/06* (2013.01); *B29L 2031/565* (2013.01)

(58) Field of Classification Search
  CPC .................. B29C 2045/1601; B29K 2009/06; B29L 2031/565

USPC ............ 220/256.1, 257.1, 257.2, 257.3, 260, 220/265, 266, 270; 264/250, 297.2, 328.1, 264/921, 453, 478, 37.33; 215/250, 255, 215/251, 253

See application file for complete search history.

(56) References Cited

U.S. PATENT DOCUMENTS 4,424,918 A * 1/1984 Stull .......................... 222/153.14
4,553,683 A * 11/1985 Paradis ........................... 220/266
5,857,796 A * 1/1999 Waldmann ..................... 401/277
5,975,381 A   11/1999 Revenu (Continued)

FOREIGN PATENT DOCUMENTS

EP  0673852 A1  9/1995
EP  1024091 A1  8/2000

OTHER PUBLICATIONS

ISA European Search Report, International Search Report of PCT/GB2011/001174, Jan. 12, 2011, Netherlands, 2 pages.

*Primary Examiner* — Robert J Hicks
*Assistant Examiner* — Kareen Rush
(74) *Attorney, Agent, or Firm* — Alleman Hall McCoy Russell & Tuttle LLP

(57) ABSTRACT

A thermoformed article having two or more parts (125, 130) is provided. A first part is formed from a first thermoplastic material and a second part (130) is formed from a second thermoplastic material. The first and second materials are mutually incompatible. One of the parts (130) has one or more projections (131) and the other part (125) has one or more corresponding cavities (126*a*) into which the projections are formed. In which the mouth of the or each cavity is narrower than at least part of the or each projection such that the shape of the or each projection allows withdrawal from but resists reinsertion into the or each cavity.

20 Claims, 7 Drawing Sheets

(56) References Cited

U.S. PATENT DOCUMENTS

| | | | |
|---|---|---|---|
| 6,170,720 B1 * | 1/2001 | Gnepper et al. | 222/481.5 |
| 8,272,522 B2 * | 9/2012 | Stull et al. | 215/253 |
| 2004/0112855 A1 | 6/2004 | Becker | |
| 2007/0125781 A1 * | 6/2007 | Schuetz et al. | 220/258.2 |

* cited by examiner

THERMOFORMED ARTICLE

CROSS-REFERENCE TO RELATED APPLICATIONS

The present application is a continuation of International PCT Application Serial No. PCT/GB2011/001174, entitled "A Thermoformed Article," filed Aug. 4, 2011, which claims priority to Great Britain Application No. 1013137.3, filed Aug. 4, 2010, each of which are hereby incorporated by reference in their entirety for all purposes.

The present invention relates generally to an article and particularly to a thermoformed article having two or more parts.

There are many situations in which articles, such as closures, with multiple parts are required. For example, closures requiring tamper evidence or dispensing closures. It is known to provide closures in which components are formed separately and physically connected together, for example by snap-engagement.

It is known from U.S. Pat. No. 5,975,381 to bi-injection mould a closure from two materials which are mutually incompatible.

The present invention seeks to provide an improved multi-part article such as a closure.

According to a first aspect of the present invention there is provided a thermoformed article having two or more parts, a first part being formed from a first thermoplastic material and a second part being formed from a second thermoplastic material, the first and second materials being mutually incompatible, one of the parts having one or more projections and the other part having one or more corresponding cavities into which the projections are formed, in which the mouth of the or each cavity is narrower than at least part of the or each projection such that the shape of the or each projection allows withdrawal from but resists reinsertion into the or each cavity.

The or a projection may be formed as a plug, for example a frustoconical member narrowing towards its root.

The or a cavity may be formed as a blind hole. Alternatively the or a cavity may be formed as a through hole. Blind and through holes may be provided on the same part.

The or a projection may comprise or include a reverse taper. The material from which the projection is formed may be compressible.

One or the materials may comprise a styrenic block copolymer-based thermoplastic elastomer.

Mutual incompatibility means that the two materials cannot form a mechanical bond between them by melting. Thus they can, for example, be formed using a sequential thermoforming moulding process without bonding together.

According to a second aspect of the present invention there is provided a thermoformed closure comprising two or more parts in which a first part is formed from a first thermoplastic material and a second part is formed from a second thermoplastic material, wherein the first and second materials are mutually incompatible and one of the materials comprises a styrenic block copolymer—based thermoplastic elastomer.

There are three main types of styrenic block copolymer (SBC) which may be used to form the closure part: styrene-butadiene-styrene (SEB); styrene-isoprene-styrene (SIS); and styrene-ethylene-butylene-styrene (SEBS).

Being thermoplastic elastomers, SBCs possess the mechanical properties of rubber and the processing characteristics of thermoplasts. At ambient temperatures, SBCs are more "rubber-like" than any other thermoplastic elastomer (TPE). All SBCs have good chemical resistant to water, acids, bases and polar solvents.

The second material may comprise the thermoplastic elastomer.

The first material may comprise a polyolefin such as polypropylene or polyethylene. This material may be harder than the TPE.

The use of a non-bonding SBC-based TPE in combination with a polyolefin material has been found to give excellent results when tested for performance, ease of separation and incompatibility.

The thermoplastic elastomer may be SEBS-based. SEBS have improved resistance to thermal and oxidative degration and thus may be preferred for certain applications.

One of the parts may comprise an orifice and the other part covers the orifice.

The article or closure may comprise a nozzle and a stopper. The nozzle may be formed from the first material and the stopper may be formed from the second material.

One of the parts, such as the second part, may comprise a tamper-evident member.

The melting point of the first material may be higher than that of the second material, for example by at least 10%.

The article or closure may be formed by bi-injection moulding. For example core-back moulding.

The closure may be formed so that the parts are separable. Further, the closure can be formed in such a way that after first opening it cannot be reclosed, i.e. the parts cannot be stably put back together.

The closure may be formed with one of the parts arranged as a pull-off or tear-off component, such as a tear-off cap. In one embodiment the closure is arranged as a nozzle with a tear-off cap. Such closures are of the type, for example, used in conjunction with hair colouring products.

According to a further aspect there is provided a closure as described herein in combination with a container.

The present invention will now be more particularly described, by way of example, with reference to the accompanying drawings, in which.

Figure 1:
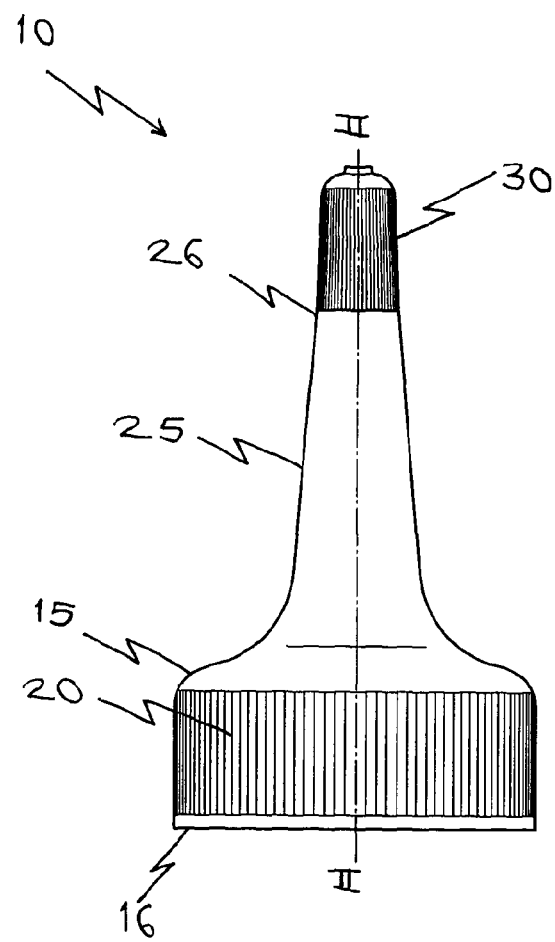
FIG. 1 is a side elevation of a closure formed according to a first embodiment.
Figure 2:
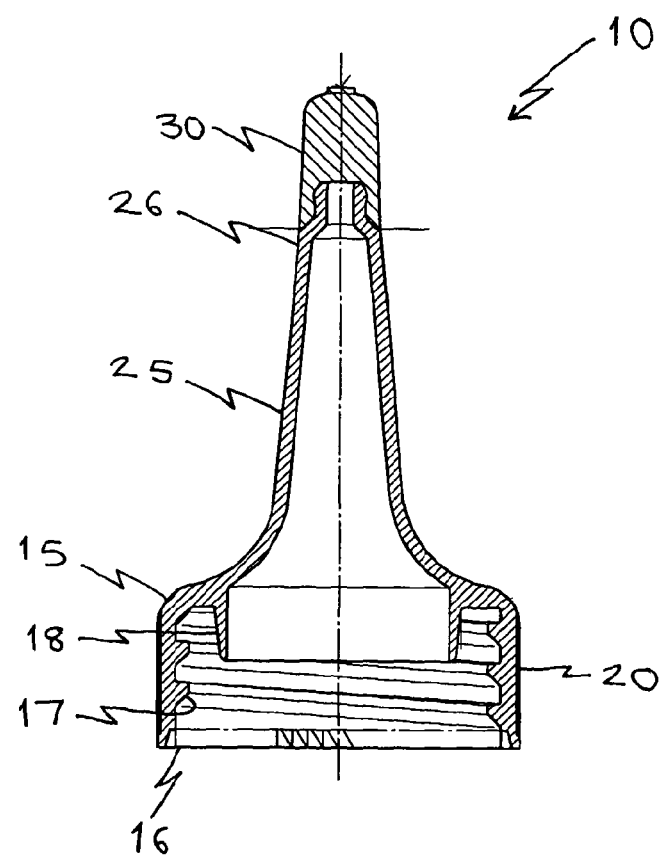
FIG. 2 is a section of the closure of FIG. 1 taken along line II-II.

Referring first to FIGS. 1 and 2 there is shown a dispensing closure generally indicated 10.

The closure 10 comprises a generally cylindrical base 15 having a plurality of longitudinal ribs 20 extending around its exterior.

The base 15 is open at one end 16. The other end of the base merges into an elongate nozzle 25 comprising a hollow tube the diameter of which decreases towards its free end 26.

The interior of the base 15 is provided with screw thread formations 17 for engaging corresponding formations on a container neck (not shown). Other types of engagement means, including snap-on, are possible. Further, the base 15 is provided with a sealing plug 18 which fits sealingly into the bore of the container neck mouth in use.

Figure 3:
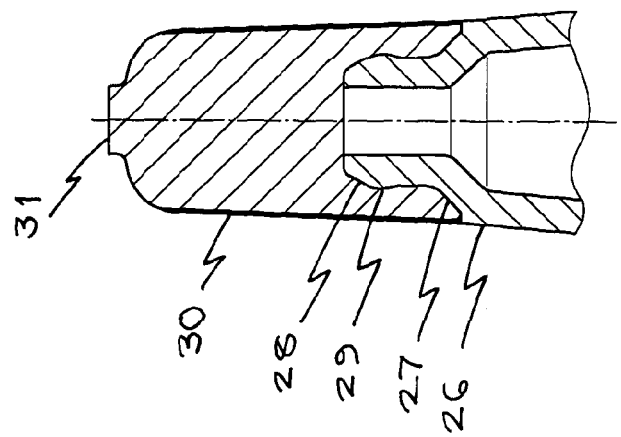
FIG. 3 is a magnified view of the tip region of the closure of FIG. 2 shown in an unopened condition.

Referring now also to FIG. 3, the end 26 of the nozzle 25 includes a shoulder 27 which merges into a tip 28 including a circumferential bead 29.

The end 26 is covered by a stopper or cap 30 which in this embodiment is generally frusto-conical. The cap 30 terminates with a raised turret 31 at one end. The other end of the cap 30 is shaped to fit around the shoulder 27 and tip 28 of the nozzle end 26.

The closure 10 is formed by a sequential moulding process. In this process the base 15 and integral nozzle 25 are formed in a first injection moulding process, in this embodiment from polypropylene. The injection point for the polypropylene material is illustrated in FIG. 2. Subsequently, the mould is moved to define a space for a second injection moulding step for the cap 30. The cap 30 is formed from a SEBS-based TPE and the injection point is illustrated on FIG. 2.

The cap 30 is therefore moulded around the nozzle end 26. The materials from which the cap and nozzle are formed are incompatible so that there is no mechanical bonding of the cap to the nozzle due to the moulding process. Depending on the materials used there may be a certain amount of sticking of the cap to the nozzle end but there is no bonding.

Figure 4:
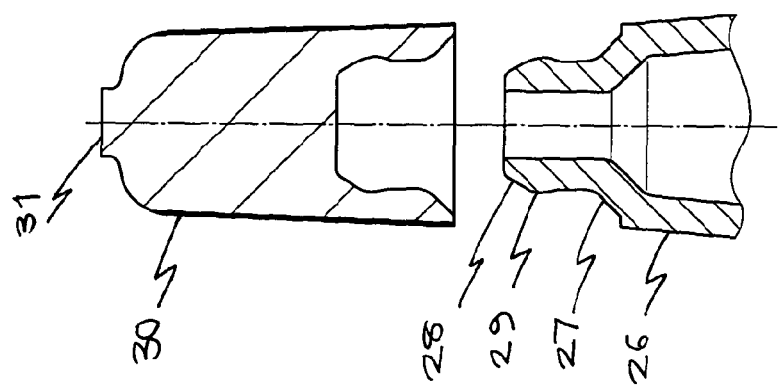
FIG. 4 is a magnified view of the tip of FIG. 3 shown with a stopper component removed.

In use, the nozzle 25 can be unblocked by pulling the cap 30 away from the nozzle end 26 as shown in FIG. 4. Resistance to this is provided only by the slight physical barrier provided by the bead 29 and any residual sticking between the materials.

Figure 6:
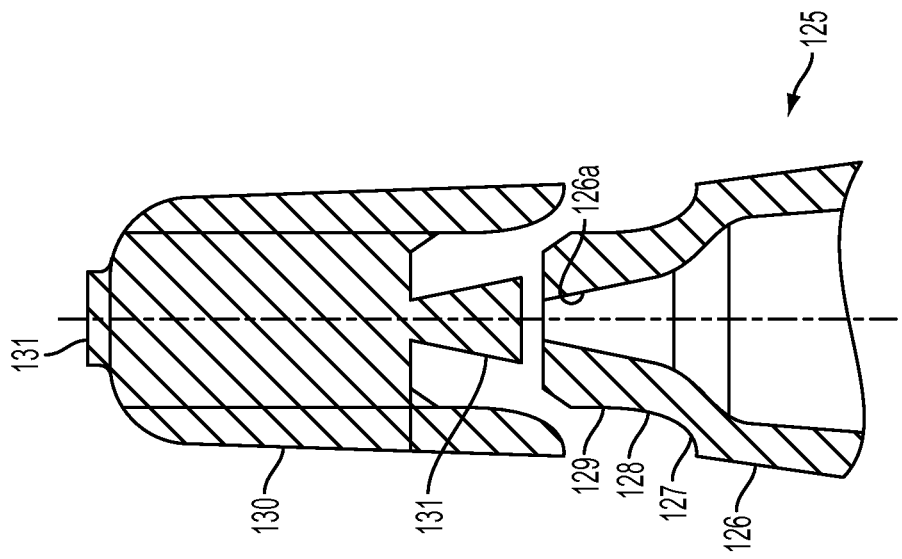
FIG. 6 is a section of the tip region of FIG. 5 shown with a stopper removed.
Figure 5:
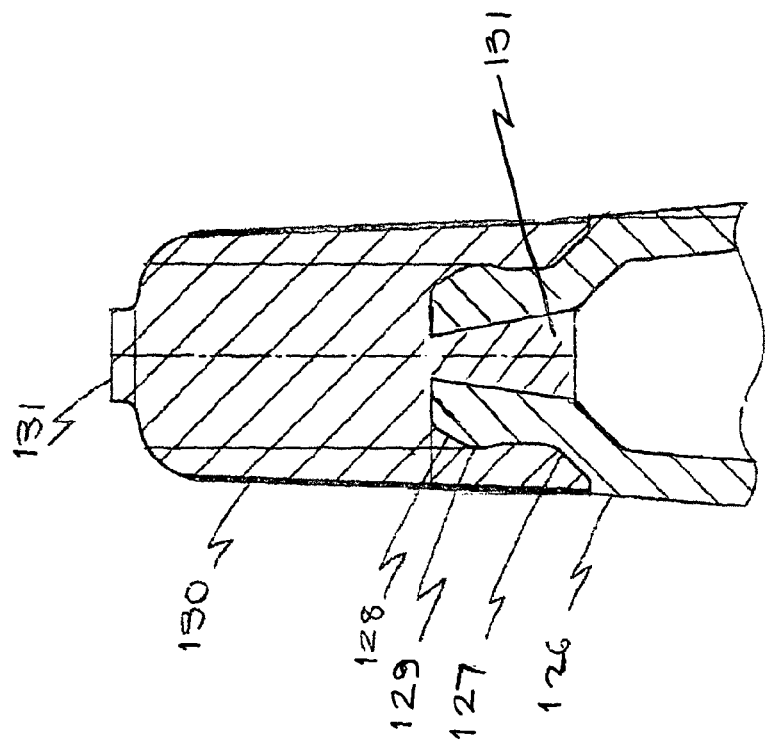
FIG. 5 is a section of the tip region of a closure formed according to an alternative embodiment and shown in an unopened, as-moulded position.

Referring now to FIGS. 5 and 6 there is shown the end region of a closure formed according to an alternative embodiment. The end 126 is very similar to the end 26 shown in FIGS. 1 to 4. In this embodiment the tip mouth cavity 126a is an inverted frusto-conical shape. This means that when the cap 130 is moulded onto the nozzle 125, the mould can be formed so that a frusto-conical extension piece 131 flows into the tip mouth as shown in FIG. 5. The piece 131 then acts like a champagne cork and can be compressed and pulled out of the tip mouth when the cap is pulled off as shown in FIG. 6. The inverted frusto-conical shape of the piece 131 means that once the cap 130 is removed it is not possible to re-insert it back into the tip mouth. This therefore presents re-closing of the nozzle.

Figure 7:
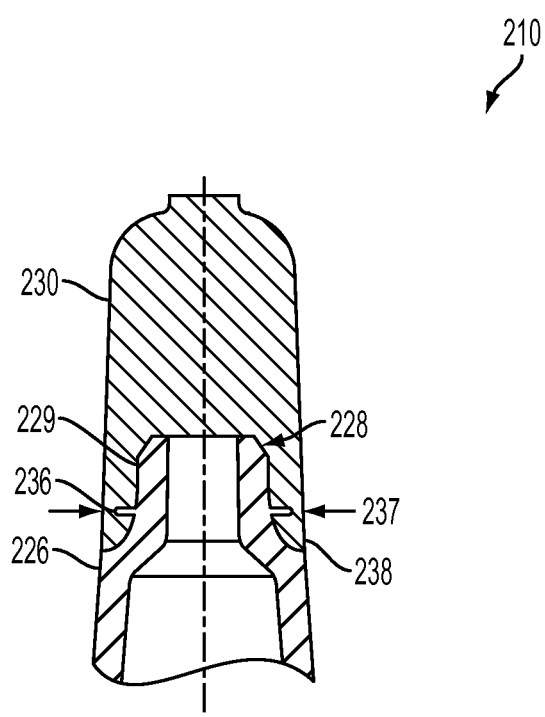
FIG. 7 is a section of the tip region of a closure formed according to an alternative embodiment and shown in an unopened, as-moulded position.

Referring now to FIG. 7 there is shown a closure 210 formed according to an alternative embodiment.

The closure 210 is similar to the closure 10 in that it comprises a base with a nozzle extending therefrom. The free end of the nozzle 226 is also provided with a bi-injection moulded cap 230.

The tip 228 is provided with a retaining ring 236 which projects radially outwards beneath the bead 229. The cap 230 is moulded over the tip 228 and the ring 236 causes a thinned region 237 to be formed in the cap which defines a break line.

When the cap 236 is removed the break band 238 defined below the line 237 cannot pass over the ring 236. Accordingly the cap is torn at the line 237 to leave the band 238 on the tip 228. The line 237 may be further defined by bridges in between which no cap material is present. For this purpose the ring could have extension lugs (not shown) like a cog wheel that extend to the full width of the cap. Alternatively the cap mould could be adjusted to provide the bridges.

In this embodiment the base/nozzle component is formed from low density polyethylene. The cap is formed from a hydrated styrene block copolymer, which in this embodiment is based on TPE from the Thermolast K family produced by Kraiburg.

Figure 8:
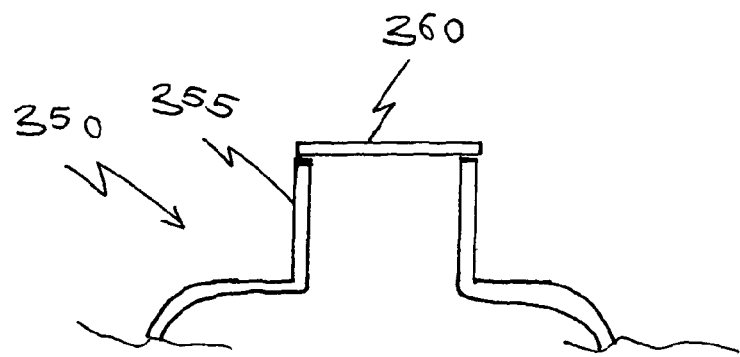
FIG. 8 is a section of a closure formed according to an alternative embodiment.

Referring now to FIG. 8 there is shown a container generally indicated 350 including a neck 355. The mouth of the neck 355 is closed by a panel 360.

The panel 360 is co-formed with the container 350 so that it covers the mouth. The container 350 and panel 360 are formed from incompatible materials, with the container 350 being formed from polyethylene terephthalate (PET) and the panel is formed from an SEBS-based TPE. The panel 350 can be pulled away from the container neck. Thereafter the panel cannot be replaced onto the neck.

Figure 9:
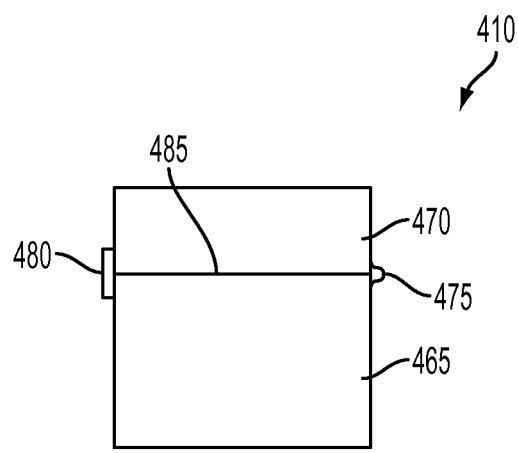
FIG. 9 is a section of a closure formed according to a further embodiment.

Referring now to FIG. 9 there is shown a closure 410 formed according to an alternative embodiment. The closure 410 comprises a base 465 and a lid 470 joined together by a hinge 475 to form a flip-top closure. Opposite the hinge 475 a tamper-evident member 480 is provided. The member 480 extends across the split line 485 between the base 465 and the lid 470. The tab 480 is sequentially moulded onto the closure and is held in place in the absence of any mechanical bonding. When access to the closure is required the member 480 must be removed in order to allow the lid 470 to be flipped open. It is then impossible to replace the member 480 when the closure is reclosed.

Figure 10:
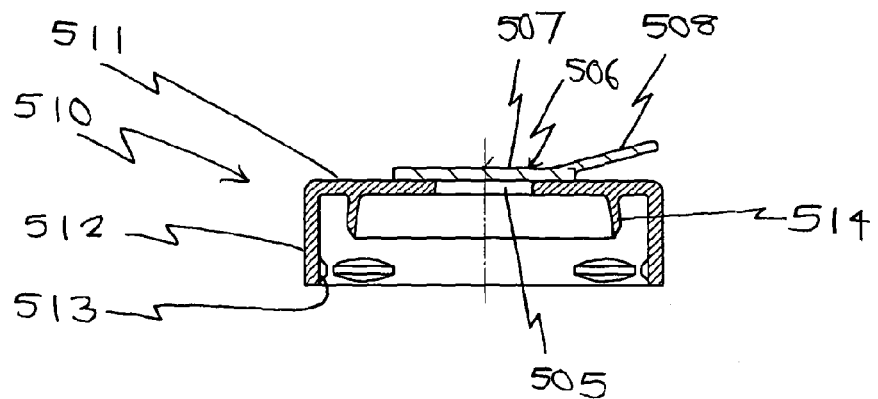
FIG. 10 is a section of a closure formed according to an alternative embodiment.

Referring now to FIG. 10 there is shown a closure 510 formed according to an alternative embodiment. The closure 510 comprises body having a top plate 511 with a cylindrical sidewall 512 depending from its periphery. The interior of the skirt 512 includes a segmented snap bead 513 towards its open end for engaging a corresponding bead on a container neck (not shown). An annular sealing plug 514 depends from the interior of the top plate 511.

The top plate 511 includes a central orifice 505. The orifice 505 is covered by a panel 506 including a base 507 and a pull tab 508.

The closure body is formed from polypropylene and the panel 506 is formed from an incompatible SBC-based TPE which is sequentially moulded onto the body. The panel 506 can be peeled off the plate 511 to reveal the orifice 505. Thereafter the incompatibility of the materials means that the panel 506 cannot be replaced.

Figure 11:
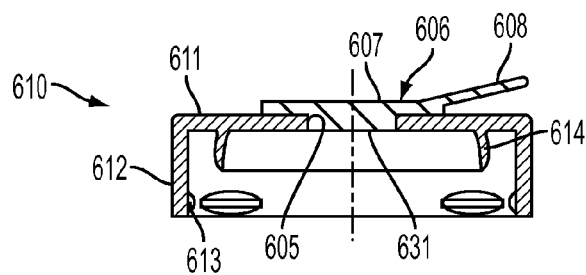
FIG. 11 is a section of a closure formed according to a further embodiment.

Referring now to FIG. 11 there is shown a closure 610 formed according to an alternative embodiment. The closure 610 is very similar to the closure 510 except that the panel 506 includes a frustoconical projection 631 which extends into the orifice 605 that has a matching tapered shape to receive the projection 631. The panel can be lifted off to reveal the orifice, but thereafter cannot be replaced because of the reverse tapered projection.

Figure 12:
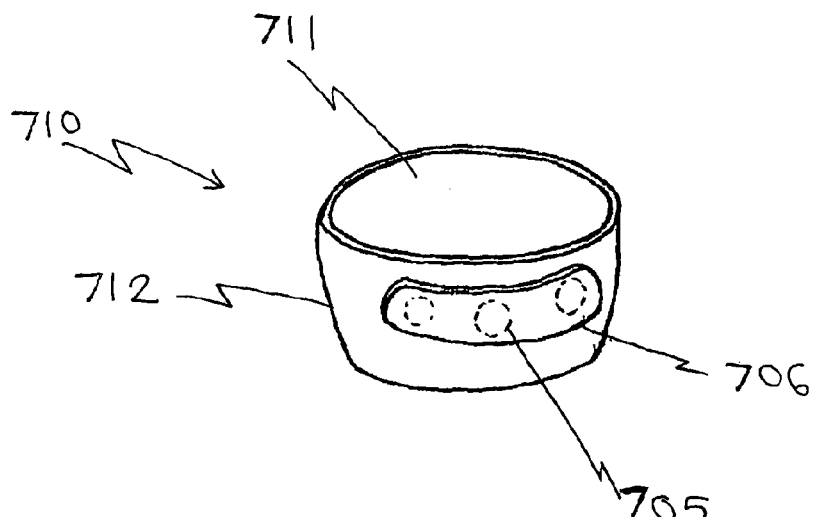
FIG. 12 is a perspective view of a closure part formed according to a further embodiment.

Referring now to FIG. 12 there is shown a closure 710 formed according to an alternative embodiment. The closure comprises a body with a top plate 711 with a curved sidewall 712 depending from its periphery. The sidewall 712 includes a plurality of orifices 705.

The orifices 705 are covered by a generally rectangular panel 706. The closure body is formed from polyethylene and the panel 706 is formed from an SBC-based TPE. The panel is moulded across the sidewall 712 to cover the orifices 705. The panel 706 can be peeled away from the sidewall 712 to reveal the orifices 705. In this way the panel could be thought of as a replacement for paper- or plastics-based stickers which are used to cover orifices of products such as air fresheners.

Any of the features or characteristics of any of the aspects or embodiments described herein can, of course, be combined with each other and/or provided separately.

The invention claimed is:

1. A thermoformed article having two or more parts, a first part being formed from a first thermoplastic material and a second part being formed from a second thermoplastic material, the first and second materials being mutually incompatible, wherein the first part comprises an orifice and the second part comprises a panel formed to cover the orifice, such that in use, the panel can be removed to reveal the orifice and cannot be replaced, wherein the orifice forms a panel-receiving orifice extending through the first part, wherein the panel-receiving orifice is shaped and positioned to receive the panel, the panel fluidly blocking passage through the panel-receiving orifice, wherein the first part further comprises a top plate, the panel-receiving orifice extending through a thickness of the top plate, the top plate defining a perimeter of the panel-receiving orifice and a height of panel-receiving orifice side walls, and wherein one or more outer bottom surfaces of the panel are flush with a top surface of the top plate when the panel is received in the panel-receiving orifice.

2. The thermoformed article of claim 1, wherein the second part forms a tamper-evident member.

3. The thermoformed article of claim 1, wherein the second part comprises a pull tab.

4. The thermoformed article of claim 1, wherein the second part comprises a frustoconical projection that extends into the orifice in the first part.

5. The thermoformed article of claim 4, wherein the orifice has a tapered shape to receive the frustoconical projection.

6. The thermoformed article of claim 1, wherein one of the first and second thermoplastic materials comprises a styrenic block copolymer-based thermoplastic elastomer.

7. The thermoformed article of claim 1, wherein one of the first and second thermoplastic materials comprises a thermoplastic elastomer.

8. The thermoformed article of claim 7, wherein the thermoplastic elastomer is styrene-ethylene-butylene-styrene based.

9. The thermoformed article of claim 1, wherein the first material comprises a polyolefin.

10. The thermoformed article of claim 1, wherein a melting point of the first material is higher than that of the second material.

11. The thermoformed article of claim 1, wherein the thermoformed article is formed by bi-injection molding.

12. The thermoformed article of claim 1, wherein the thermoformed article is a closure.

13. The thermoformed article of claim 1, further comprising a container.

14. The thermoformed article of claim 1, wherein the panel-receiving orifice has a cylindrical shape, wherein the panel-receiving orifice side walls are vertical and perpendicular to the panel and the top surface of the top plate.

15. The thermoformed article of claim 1, wherein the panel-receiving orifice has a tapered shape, wherein the panel-receiving orifice side walls are angled, the panel-receiving orifice side walls tapering towards the top surface of the top plate.

16. The thermoformed article of claim 15, wherein the panel comprises a projection that extends into the orfice and has tapered side walls that match the tapered shape of the panel-receiving orifice side walls, wherein the tapered side walls are flush with the panel-receiving orifice side walls when the panel-receiving orifice receives the panel.

17. The thermoformed article of claim 16, wherein a length of the projection extending into the panel-receiving orifice is at least equal to the height of the panel-receiving orifice side walls.

18. A method of forming a thermoformed article having two or more parts, comprising:
    forming a first part of the thermoformed article in a first injection moulding step using a first thermoplastic material, the first part comprising an orifice;
    forming a second part of the thermoformed article in a second injection moulding step using a second thermoplastic material, the first and second materials being mutually incompatible, the second part comprising a panel and being formed to cover the orifice in the first part, such that in use, the panel can be removed to reveal the orifice and cannot be replaced,
    wherein the orifice forms a panel-receiving orifice extending through the first part,
    wherein the panel-receiving orifice is shaped and positioned to receive the panel, the panel fluidly blocking passage through the panel-receiving orifice,
    wherein the first part further comprises a top plate, the panel-receiving orifice extending through a thickness of the top plate, the top plate defining a perimeter of the panel-receiving orifice and a height of panel-receiving orifice side walls, and
    wherein one or more outer bottom surfaces of the panel are flush with a top surface of the top plate when the panel is received in the panel-receiving orifice.

19. The method of claim 18, wherein the thermoformed article is a closure.

20. The method of claim 18, wherein the second part comprises a pull tab.

* * * * *